(12) United States Patent
Knechtges et al.

(10) Patent No.: US 10,029,663 B2
(45) Date of Patent: Jul. 24, 2018

(54) ELECTRO-HYDRAULIC MOTOR VEHICLE BRAKE SYSTEM AND METHOD FOR THE OPERATION THEREOF

(71) Applicant: Lucas Automotive GmbH, Koblenz (DE)

(72) Inventors: Carsten Knechtges, Mayen (DE); Josef Knechtges, Mayen (DE)

(73) Assignee: Lucas Automotive GmbH, Koblenz (DE)

( * ) Notice: Subject to any disclaimer, the term of this patent is extended or adjusted under 35 U.S.C. 154(b) by 0 days.

(21) Appl. No.: 15/100,478

(22) PCT Filed: Oct. 29, 2014

(86) PCT No.: PCT/EP2014/073174
§ 371 (c)(1),
(2) Date: May 31, 2016

(87) PCT Pub. No.: WO2015/078651
PCT Pub. Date: Jun. 4, 2015

(65) Prior Publication Data
US 2016/0304072 A1    Oct. 20, 2016

(30) Foreign Application Priority Data

Nov. 28, 2013 (DE) .......................... 10 2013 018 073

(51) Int. Cl.
*B60T 13/66* (2006.01)
*B60T 8/40* (2006.01)
(Continued)

(52) U.S. Cl.
CPC ................ *B60T 13/66* (2013.01); *B60T 7/06* (2013.01); *B60T 8/4077* (2013.01); *B60T 8/4086* (2013.01); *B60T 13/741* (2013.01)

(58) Field of Classification Search
CPC ........ B60T 7/06; B60T 8/4077; B60T 8/4086; B60T 13/165; B60T 13/66; B60T 13/741; B60T 13/745
(Continued)

(56) References Cited

U.S. PATENT DOCUMENTS

| | | | | |
|---|---|---|---|---|
| 6,604,795 B2* | 8/2003 | Isono | ..................... | B60T 8/4081 303/11 |
| 6,899,403 B2* | 5/2005 | Isono | ..................... | B60T 8/4081 303/11 |

(Continued)

FOREIGN PATENT DOCUMENTS

| | | |
|---|---|---|
| DE | 102011085273 A1 | 5/2012 |
| DE | 102011086258 A1 | 5/2012 |

(Continued)

OTHER PUBLICATIONS

PCT International Search Report and the Written Opinion, Application No. PCT/EP2014/073174 filed Oct. 29, 2014, dated Dec. 23, 2014.

(Continued)

*Primary Examiner* — Thomas W Irvin
(74) *Attorney, Agent, or Firm* — MacMillan, Sobanski & Todd, LLC

(57) ABSTRACT

An electro-hydraulic motor vehicle brake system is provided, having a first cylinder-piston device, which can be fluidically coupled to at least one wheel brake of the brake system, for generating hydraulic pressure on the at least one wheel brake, wherein the first cylinder-piston device comprises at least one first piston. The brake system further has a second cylinder-piston device, which comprises at least one second piston, and an electromechanical actuator which acts on the second piston of the second cylinder-piston device. The second cylinder-piston device is or can be fluidically coupled at the output side to the first piston of the (Continued)

first cylinder-piston device in order to provide a hydraulic pressure, which is generated in the second cylinder-piston device upon actuation of the electromechanical actuator, for actuating the at least one first piston of the first cylinder-piston device.

12 Claims, 2 Drawing Sheets

(51) Int. Cl.
*B60T 7/06* (2006.01)
*B60T 13/74* (2006.01)

(58) Field of Classification Search
USPC .......................................... 303/115.1, 115.2
See application file for complete search history.

(56) References Cited

U.S. PATENT DOCUMENTS

| | | | | |
|---|---|---|---|---|
| 7,922,264 | B2* | 4/2011 | Baumann | B60T 8/4081 |
| | | | | 303/114.1 |
| 8,231,181 | B2* | 7/2012 | Hatano | B60T 7/042 |
| | | | | 188/345 |
| 8,342,615 | B2* | 1/2013 | Drumm | B60T 8/4077 |
| | | | | 188/152 |
| 8,523,294 | B2* | 9/2013 | Klimes | B60T 7/042 |
| | | | | 303/115.2 |
| 9,145,121 | B2* | 9/2015 | Jungbecker | B60T 7/042 |
| 9,227,611 | B2 | 1/2016 | Gilles | |
| 9,315,180 | B2* | 4/2016 | Jungbecker | B60T 8/4081 |
| 9,541,102 | B2* | 1/2017 | Leiber | B60T 7/042 |
| 2008/0258545 | A1* | 10/2008 | Drumm | B60T 8/3275 |
| | | | | 303/114.1 |
| 2011/0272228 | A1 | 11/2011 | Kunz et al. | |
| 2013/0213034 | A1 | 8/2013 | Leiber | |
| 2013/0234501 | A1 | 9/2013 | Leiber | |
| 2013/0234502 | A1 | 9/2013 | Drumm | |
| 2015/0343905 | A1* | 12/2015 | Knechtges | B60T 7/042 |
| | | | | 303/3 |
| 2016/0297413 | A1* | 10/2016 | Alford | B60T 8/4081 |
| 2017/0001615 | A1* | 1/2017 | Adler | B60T 7/042 |

FOREIGN PATENT DOCUMENTS

| | | |
|---|---|---|
| DE | 102011085986 A1 | 7/2012 |
| DE | 102012212836 A1 | 2/2013 |
| WO | 2012059175 A1 | 5/2012 |
| WO | 2012062393 A1 | 5/2012 |
| WO | 2012152352 A1 | 11/2012 |

OTHER PUBLICATIONS

PCT International Preliminary Report on Patentability, Application No. PCT/EP2014/073174 filed Oct. 29, 2014, dated Jan. 28, 2016.

* cited by examiner

ELECTRO-HYDRAULIC MOTOR VEHICLE BRAKE SYSTEM AND METHOD FOR THE OPERATION THEREOF

CROSS-REFERENCE TO RELATED APPLICATIONS

This application is the National Phase of International Application PCT/EP2014/073174 filed Oct. 29, 2014 which designated the U.S. and was published on Jun. 4, 2015 as International Publication Number WO 2015/078651 A1. PCT/EP2014/073174 claims priority to German Patent Application No. 10 2013 018 073.2, filed Nov. 28, 2013. Thus, the subject nonprovisional application claims priority to German Patent Application No. 10 2013 018 073.2, filed Nov. 28, 2013. The disclosures of these applications are incorporated herein by reference.

BACKGROUND OF THE INVENTION

The present disclosure relates to the field of brake systems in general. An electro-hydraulic motor vehicle brake system is described in concrete terms. Modern motor vehicle brake systems operate according to the "brake-by-wire" principle. This means that a hydraulic pressure is built up on the wheel brakes by way of a hydraulic pressure generator, independently of a foot force. In addition to the hydraulic pressure generator, brake systems of this type generally comprise a brake pedal interface with sensor technology for detecting an actuation of a brake pedal, a simulator device, which is coupled to the brake pedal interface, for simulating a realistic pedal reaction behaviour and a plurality of hydraulic valves.

Brake-by-wire brake systems have a plurality of advantages. For example, they are excellently suited for the integration of energy recovery systems. Furthermore, as a result of such brake systems, it is possible to better control a build-up of pressure for individual wheels and to better integrate vehicle dynamics management programs (e.g. ABS-, ASR-, ESP-programs).

Examples for the realisation of brake-by-wire brake systems are known from WO 2012/062393 A1 and WO 2012/152352 A1. The hydraulic pressure generators taught therein comprise a cylinder-piston device for hydraulic pressure generation and an electromechanical actuator acting on the piston of the cylinder-piston device. The electromechanical actuator is arranged downstream of the cylinder-piston device and is coupled directly to the piston of the cylinder-piston device. The piston can therefore be actuated directly by way of the actuator, thereby enabling a hydraulic pressure to build up on the wheel brakes independently of a foot force.

The cylinder-piston device can furthermore be coupled by way of a force transmission device to a pedal interface arranged downstream of the cylinder-piston device and the electromechanical actuator. In an emergency operation of the brake system (e.g. in the event of a failure of the electromechanical actuator or its control means), the force transmission device enables a mechanical coupling of the cylinder-piston device to the brake pedal interface to enable an actuation of the piston of the cylinder-piston device by means of the foot force applied to the pedal interface (push-through operation).

In some realisations, the serial arrangement of the cylinder-piston device, electromechanical actuator and pedal interface results in a relatively long axial extent of the assembly formed thereby. Correspondingly large installation spaces have to be provided in the motor vehicles. Hydraulic pressure generators with a long axial extent can furthermore have a negative influence on the crash safety of a vehicle. The architecture of the hydraulic pressure generators described in WO 2012/062393 A1 and WO 2012/152352 A1 also calls for the installation of powerful actuators which are capable of applying sufficiently high piston actuating forces to generate the necessary hydraulic pressures in the brake-by-wire braking operation.

SUMMARY OF THE INVENTION

The invention provides a motor vehicle brake system which overcomes one or more of the above-mentioned problems or other disadvantages of known brake system architectures.

According to a first aspect, an electro-hydraulic motor vehicle brake system is provided, having a first cylinder-piston device, which can be fluidically coupled to at least one wheel brake of the brake system, for generating hydraulic pressure on the at least one wheel brake, wherein the first cylinder-piston device comprises at least one first piston, having a second cylinder-piston device, which comprises at least one second piston, and having an electromechanical actuator acting on the second piston of the second cylinder-piston device, wherein the second cylinder-piston device is or can be fluidically coupled at the output side to the at least one first piston of the first cylinder-piston device in order to provide a hydraulic pressure, which is generated in the second cylinder-piston device upon actuation of the electromechanical actuator, for actuating the at least one first piston of the first cylinder-piston device.

In one variant, the generation of hydraulic pressure in the at least one wheel brake can be effected by the first cylinder-piston device alone. For example, the first cylinder-piston device can be provided as a single pressure generating unit for the wheel brakes. This unit can generate a required hydraulic pressure (brake pressure) on the wheel brakes both in a push-through operation and in a brake-by-wire operation of the electro-hydraulic motor vehicle brake system.

The hydraulic pressure can be generated by the actuation (e.g. the forward movement and/or reverse movement) of the at least one first piston in the first cylinder. The strength of the displacement of the at least one first piston (i.e. the extent of the piston actuation) can be a measure here of the strength of the hydraulic pressure generated on the wheel brakes. In the push-through operation, the actuation of the at least one first piston is effected depending on a foot force. In the brake-by-wire operation of the brake system, the actuation of the first piston is effected independently of a foot force with the aid of the electromechanical actuator.

The electro-hydraulic brake system can further comprise a pedal interface, which can be coupled to a brake pedal, with a third cylinder-piston device which can be selectively coupled to the first cylinder-piston device for generating hydraulic pressure. In the push-through operation of the brake system, the third cylinder-piston device can be coupled to the first cylinder-piston device. On the other hand, in the brake-by-wire operation of the brake system, the third cylinder-piston device can be uncoupled from the first cylinder-piston device. The coupling can be effected mechanically here. For example, the brake system can comprise a mechanical coupling device (or force transmission device) which is designed to couple the first piston of the first cylinder-piston device mechanically to the third piston of the third cylinder-piston device.

The third piston of the third cylinder-piston device can be coupled to the brake pedal. Therefore, in one variant, a brake-pedal actuation (e.g. a depression or a backwards movement of the brake pedal) and, in particular, the actuating force applied to the brake pedal can be transmitted directly to the first piston. Therefore, in the push-through operation of the brake system, a hydraulic pressure can be built up directly on the wheel brakes, which are fluidically coupled to the first cylinder-piston device, by way of the foot force applied to the brake pedal.

The second cylinder-piston device can be provided to supply a hydraulic pressure (actuating pressure) in a brake-by-wire operation of the brake system for the hydraulic actuation of the first piston of the first cylinder-piston device. The strength of the actuating pressure provided specifies the degree of actuation of the first piston (and therefore the hydraulic pressure generated on the wheel brakes). The provision of the actuating pressure can depend on (e.g. be proportional to) a detected braking intention or the commands from a vehicle dynamics management program. The braking intention can be detected by sensor technology on the brake pedal or in the brake pedal interface and be converted by an electronic control unit of the brake system into corresponding actuating signals for the electromechanical actuator. The braking intention can be determined for example by detecting a brake pedal travel and/or an actuating force acting on the brake pedal. The vehicle dynamics management program, for example an antilock braking system (ABS), an anti-slip regulation (ASR), an electronic stability program (ESP), also known as vehicle stability control (VSC), or an adaptive cruise control (ACC) can be stored in the electronic control unit. Commands for the electromechanical actuator can be outputted on the basis of detected sensor data indicating a driving state of the vehicle.

As a function of the actuating signals or commands, the electromechanical actuator can move the second piston and thereby generate a hydraulic actuating pressure for the at least one first piston. It is possible here for the generation of the actuating pressure to not simply be restricted to the generation of a set pressure value for specifying the strength of the actuation of the first piston. Instead, the time duration and/or the speed of the actuation of the second piston can be specified via a corresponding control of the mechanical actuator. Therefore, the speed and/or the time duration of the actuation of the at least one first piston can also be specified solely by the actuating pressure provided (and therefore independently of a foot force). As a result of a corresponding time regulation of the actuating pressure provided in the second cylinder-piston device, the hydraulic actuation of the first piston can be controlled on a time basis. It is therefore possible to realise any desired hydraulic pressure build-up, hydraulic pressure maintenance and/or hydraulic pressure reduction phases.

The first piston of the first cylinder-piston device and the second cylinder-piston device can be fluidically connected to one another by way of a fluid path of the brake system. The first piston and the second piston can be fluidically connected in series by way of the fluid path. A hydraulic fluid which is displaced out of the second cylinder-piston device upon actuation of the second piston can arrive by way of the fluid path at the first piston of the first cylinder-piston device, whereby this first piston is actuated. A mechanical actuation of the second piston can therefore be converted into a hydraulic actuation of the first piston. Since the hydraulic fluid located in the fluid path and in the second cylinder-piston device is non-compressible, each electromechanical actuation of the second piston is transmitted without loss into a corresponding hydraulic actuation of the first piston. In particular, the actuating pressure applied to the actuated second piston can correspond to the actuating pressure applied to the first piston.

The first cylinder-piston device and the second cylinder-piston device can be constructed in such a way that an effective surface of the at least one first piston and an effective surface of the second piston, on which the generated hydraulic pressure acts in each case, are at a predetermined ratio to one another. For example, the first piston and the second piston can have the same effective surface or the second piston can have a smaller or a larger effective surface than the first piston. A transmission ratio for the actuating forces acting on the first piston and the second piston can be specified by the dimensions of the effective surfaces of the first piston and the second piston. This is the case since, as a result of the serial coupling of the at least one first piston to the second piston, the hydraulic pressure which is generated in the second cylinder-piston device through the displacement of the second piston can act on both pistons. The actuating force which is or will be effectively applied to the first piston and to the second piston in each case can then be the exact result of the product of the actuating pressure generated and the respective piston surface which is acted upon by the actuating force.

According to one variant, the effective surface of the second piston (or the piston diameter) can be of a smaller construction than the effective surface of the first piston. In this case, the actuating force applied to the first cylinder when a hydraulic pressure is generated can be greater than the actuating force which is or will be applied to the second piston by a factor which can be calculated from the ratio of the two effective surfaces of the first and the second piston. It is, for example, possible to achieve a hydraulic power boost through the serial connection of a larger first piston to a smaller second piston. To build up a certain hydraulic pressure on the wheel brakes, it is only necessary to apply an actuating force to the second piston which is precisely the factor of the effective surface ratio smaller than the actuating force to be applied to the first piston. By comparison with a non-boosted system, the hydraulic power boost enables the motor torque as well as the spindle and bearing forces of the electromechanical actuator to be kept smaller for generating a predetermined hydraulic pressure.

The first cylinder-piston device can have at least two hydraulic chambers defined by the first cylinder and the at least one first piston which is displaceably received in the first cylinder. A first chamber can be defined by a first end face of the first piston and the cylinder. A second chamber can be defined by a second end face, opposite the first end face, of the first piston and the cylinder. The first chamber here can be fluidically coupled to the second cylinder-piston device. The at least one second hydraulic chamber can furthermore be fluidically coupleable to at least one brake circuit of the brake system. The first chamber can be designed to receive the hydraulic fluid displaced from the second cylinder-piston device. The first piston can thereby be displaced in the direction of the second hydraulic chamber, whereby the hydraulic fluid received in the second hydraulic chamber can be displaced into the brake circuit. This enables the first piston to be hydraulically actuated in the brake-by-wire operation and a corresponding hydraulic pressure to be built up on the wheel brakes by way of the second chamber.

According to one construction, the at least one second chamber can comprise two hydraulic chambers, with the two hydraulic chambers each being fluidically coupled or coupleable to a brake circuit of the brake system. The two hydraulic chambers can be arranged in succession in the first cylinder-piston device (arrangement of the hydraulic chambers according to the tandem principle).

The third cylinder-piston device can furthermore be selectively fluidically coupleable to the second cylinder-piston device. The selective fluidic coupling can be effected by way of a fluid path and an actuable valve which is received therein. According to one variant, the fluid path can selectively fluidically couple the third cylinder-piston device to the first chamber of the first cylinder-piston device, which chamber is fluidically coupled to the second cylinder-piston device. As an alternative to this, it is also conceivable for the third cylinder-piston device and the first cylinder-piston device to be directly fluidically coupleable by way of the fluid path. In the braking operation (push-through operation or brake-by-wire operation), the third cylinder-piston device can remain fluidically uncoupled from the second cylinder-piston device. Within the framework of an automatic bleeding of the pedal interface or a simulator circuit coupled to the pedal interface, the third cylinder-piston device can be fluidically coupled from the second cylinder-piston device. Hydraulic fluid can then be conveyed from the second cylinder-piston device into the pedal interface in order to bleed this latter.

The first cylinder-piston device and the third cylinder-piston device of the brake system can be arranged in spatial succession (serially) in the assembled state and form a separately manageable assembly, for example. The third cylinder-piston device, which can be associated with the brake pedal, can be arranged upstream of the first cylinder-piston device here, as viewed from the brake pedal. The third cylinder-piston device and the first cylinder-piston device can be arranged coaxially to one another.

The first cylinder-piston device and the second cylinder-piston device can furthermore be arranged substantially spatially parallel to one another and form a separately manageable assembly, for example. In other words, the successively arranged first and third cylinder-piston device can be arranged substantially parallel to the second cylinder-piston device. It is thus possible to further reduce the axial extent of the hydraulic pressure generator components (i.e. first, second and third cylinder-piston device).

The electro-hydraulic brake system can furthermore comprise a control device or a control device system for electrically controlling the electromechanical actuator in the brake-by-wire operation. The electrical control device or control device system can be designed to evaluate a measured variable indicating a braking intention on the part of a driver and/or a driving status of the motor vehicle and to output corresponding control commands for the actuator. Based on the evaluated sensor signals, the electrical control device or control device system can control the electromechanical actuator accordingly to generate an actuating pressure in the second cylinder-piston device.

According to a second aspect, a method is provided for operating an electro-hydraulic motor vehicle brake system. The motor vehicle brake system comprises at least one first cylinder-piston device, which can be fluidically coupled to at least one wheel brake of the brake system, for the purpose of generating hydraulic pressure on the at least one wheel brake, with the first cylinder-piston device comprising at least one piston, and a second cylinder-piston device having a second piston and having an electromechanical actuator acting on the second piston of the second cylinder-piston device, wherein the second cylinder-piston device is or can be fluidically coupled at the output side to the at least one first piston of the first cylinder-piston device. The process here comprises the steps of detecting at least one parameter, which indicates a braking intention on the part of the driver or a need for intervention on the part of the vehicle dynamics management system, and actuating the second piston of the second cylinder-piston device by means of the electromechanical actuator depending on the detected parameter in order to provide a hydraulic pressure for actuating the first piston of the first cylinder-piston device.

A parameter indicating a braking intention on the part of the driver can be for example a pedal travel of a brake pedal and/or an actuating force acting on the brake pedal.

A parameter indicating a need for intervention on the part of a vehicle dynamics management system can be for example a rotational speed of the vehicle about a vehicle axis (e.g. yaw rate), a slip value, an acceleration value and/or a velocity value of at least one wheel of the motor vehicle. A parameter indicating a need for intervention on the part of a vehicle dynamics management system can, however, also be a distance value in relation to another vehicle. An electronic vehicle dynamics management program can then output commands for actuating the electromechanical actuator depending on the detected parameter(s). In this case, the actuation of the electromechanical actuator takes place to establish a particular (e.g. stable) driving state. The actuation of the electromechanical actuator can also take place if no braking intention on the part of the driver has been detected (e.g. for adjusting the distance from a vehicle in front).

The actuation of the electromechanical actuator can be proportional to, or otherwise dependent on, the detected parameter value. Within the context of a regenerative brake system and the option of connecting a generator for energy recovery during the braking procedure, the actuation of the electromechanical actuator further depends on whether a braking intention or braking command can, or should, be implemented by the generator. In a regenerative brake system, or within the framework of a regenerative braking operation, the electromechanical actuator is then actuated for example when the braking intention or braking command cannot be implemented by the generator alone ("blending").

The actuating step can take place whilst accounting for a hydraulic transmission ratio between the first cylinder-piston device and the second cylinder-piston device.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
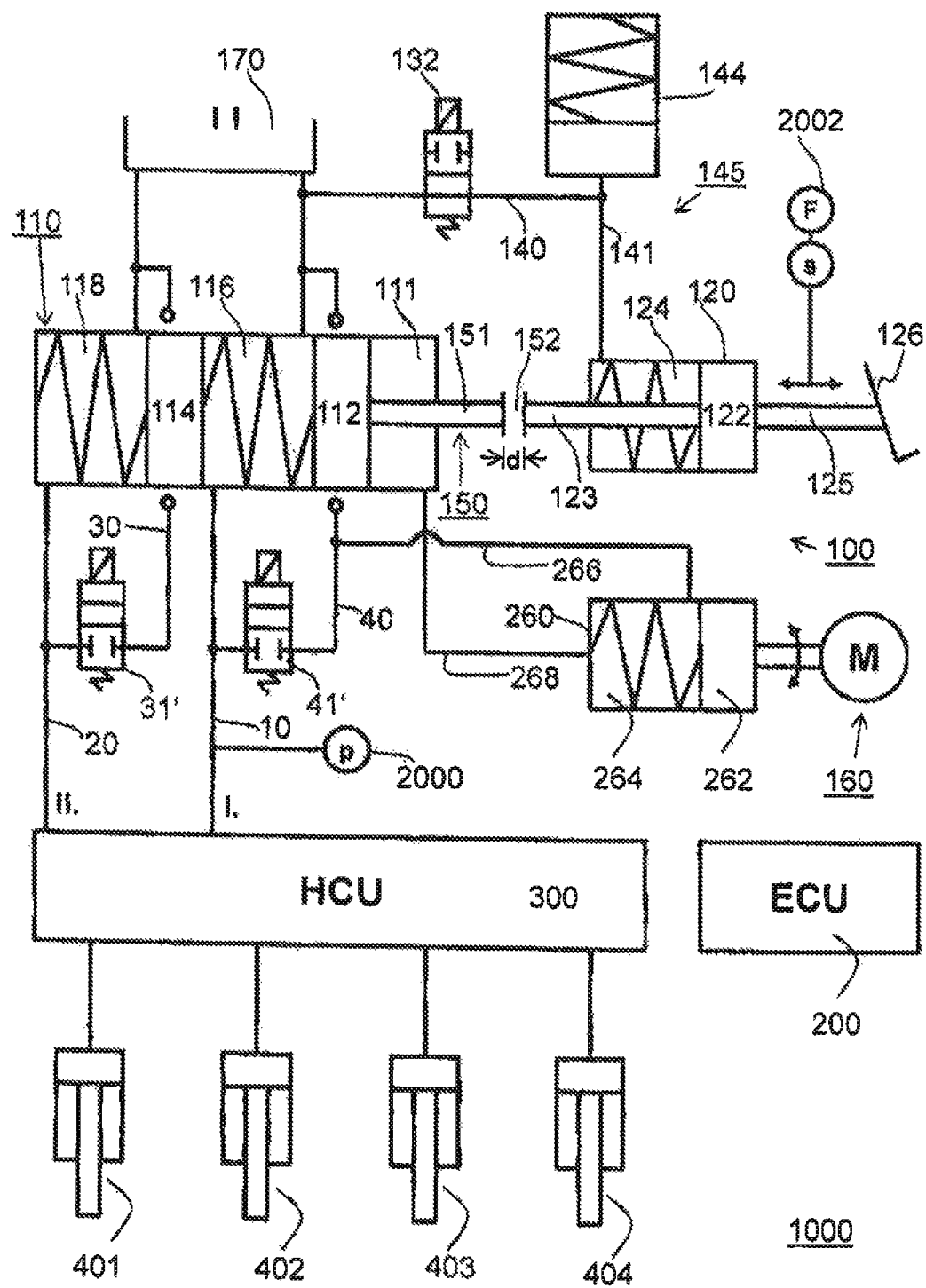
FIG. 1 illustrates an embodiment of an electro-hydraulic motor vehicle brake system.

Referring now to the drawings, FIG. 1 shows an embodiment of an electro-hydraulic motor vehicle brake system 1000. The variant shown in FIG. 1 is a dual circuit brake system with a first brake circuit 10 and a second brake circuit 20. The present invention is not dependent on the number of brake circuits in the brake system 1000.

The brake system 1000 comprises a hydraulic pressure generator assembly 100 which is fluidically coupled to the to brake circuits 10, 20, a simulator circuit 145 which is fluidically coupled to the assembly 100, a centrally arranged hydraulic fluid reservoir 170, and a fluid path 140 which fluidically couples the hydraulic fluid reservoir 170 and the simulator circuit 145 and has a valve 132 arranged therein. The brake system 1000 further comprises sensor technology 2000, 2002 for the quantitative detection of an intention on the part of the driver (e.g. detection of a pedal travel s and/or an actuating force F on the brake pedal 126) as well as a hydraulic pressure present in the brake circuits 10, 20, an electronic control device and an electronic control unit 200 (referred to below as ECU), a hydraulic control unit 300 (referred to below as HCU) and wheel brakes 401-404 which are fluidically coupled in each case to the first brake circuit 10 and the second brake circuit 20. The brake system 1000 further comprises two return lines 30, 40, each with valves 31', 41' arranged therein. The return lines 30, 40 are each fluidically coupled by a first end to a corresponding brake circuit 10, 20 and fluidically coupled by a second end to the unpressurised hydraulic fluid reservoir 170. A hydraulic pressure which has built up in the brake circuits can be reduced rapidly by way of the return lines 30, 40 (by opening the valves 31', 41', which assume a closed valve position in the non-actuated state).

As an optional addition, it is possible for the brake system to comprise a generator unit for energy recovery (not illustrated in FIG. 1). The generator unit is designed to convert kinetic energy back into electrical energy in the braking operation. For this, the generator unit is connected to at least one wheel in order to convert the rotational movement into electrical energy. The generator unit can furthermore be connected to an energy store (e.g. a battery, not shown in FIG. 1) which stores the energy obtained.

The HCU 300 comprises a plurality of electrically actuable valve groups for hydraulic pressure regulation in the two brake circuits 10, 20. Deviating from the separate construction (shown in FIG. 1) of the HCU 300, the valves 31, 41 and the first valve device 132, it is equally possible for the valves 31, 41, 132 to be integrated in the HCU 300. Examples demonstrating the realisation of the valves or valve groups of the HCU 300 are described in more detail below in conjunction with FIG. 2.

The ECU 200 is designed at least to control the electrically actuable valves of the HCU 300. It is further designed to control the assembly 100. The control procedure takes place here on the basis of the sensor signals detected by the sensor technology 2000, 2002. The ECU 200 evaluates the sensor signals and generates corresponding control signals for the valves and/or the assembly 100. For this, the ECU 200 comprises control functions for the HCU 300 and the assembly 100. As an alternative to this, it is also conceivable for the control functions for the assembly 100 and the HCU 300 to each be organised in separate electronic control units and for these sub-units to cooperate accordingly in the braking operation.

The construction and the mode of operation of the hydraulic pressure generator assembly 100 is now explained in more detail below, with reference to the brake system 1000 shown in FIG. 1.

The hydraulic pressure generator assembly 100 comprises a first cylinder-piston device 110, 112, 114, a second cylinder-piston device 260, 262 with an electromechanical actuator 160 acting on the second cylinder-piston device 260, 262 and a pedal interface 115 with a third cylinder-piston device 120, 122. The assembly 100 further comprises a fluid path 268 for the fluidic coupling of the second cylinder-piston device 260, 262 to the first cylinder-piston device 110, 112, 114 and a force-transmission device 150 for the selective coupling of the third cylinder-piston device 120, 122 to the first cylinder-piston selective 110, 112, 114. According to one variant, the unpressurised hydraulic fluid reservoir 170 can be integrated in the assembly 100 for the purpose of storing hydraulic fluid.

As discussed in more detail below, the assembly 100 presented here is designed to build up a necessary hydraulic pressure on the wheel brakes 401-404 through the actuation of the first piston 112, 114 of the first cylinder-piston device 110, 112 alone. The actuation of the first piston 112, 114 in a push-through operation of the brake system 1000 is effected in dependence on a foot force through the coupling of the first cylinder-piston device to the third cylinder-piston device 120 and, in a normal operation (or brake-by-wire operation) of the brake system 1000, independently of a foot force through the hydraulic coupling of the first cylinder-piston device 110, 112, 114 to the second cylinder-piston device 260, 262. The brake system 1000 or the assembly 100 is usually in normal operating mode and only switches to a push-through operation when the pistons 112, 114 of the first cylinder-piston device 110, 112, 114 cannot be hydraulically actuated by way of the second cylinder-piston device 260, 262. This can be the case for example if the electromechanical actuator 160 or its electronic control is not functioning properly or has failed (e.g. upon a failure of the on-board power system).

The first cylinder-piston device 110, 112, 114 and the second cylinder-piston device 260, 262, which is fluidically coupled to the first cylinder-piston device 110, 112, 114, are described in the first instance.

The first cylinder-piston device 110, 112, 114 comprises a first piston 112 (referred to below as primary piston) which is displaceably received in a first cylinder 110 and a second piston 114 (referred to below as secondary piston or floating piston) which is displaceably received in the first cylinder 110. Both pistons 112, 114 can be coupled to a respective spring device which are designed to restore the two pistons 112, 114 to their starting position in the non-actuated state.

The primary piston 112 and secondary piston 114 are arranged in succession in the first cylinder 110 (tandem principle) and define three hydraulic chambers 111, 116, 118. A first hydraulic chamber 111 is defined by an end face of the primary piston 112 which faces away from the actuating direction for the hydraulic pressure generation (right-hand end face in FIG. 1, referred to below as the rear side) and a first cylinder base which faces the rear side of the primary piston 112. A second hydraulic chamber 116 is defined by an end face of the primary piston 112 which faces in the actuating direction for the hydraulic pressure generation (left-hand end face of the primary piston in FIG. 1) and by an end face of the secondary piston 114 which faces away from the actuating direction for the hydraulic pressure generation. Furthermore, a second hydraulic chamber 118 is defined by an end face of the secondary piston 114 which faces in the actuating direction for the hydraulic pressure generation (left-hand end face of the secondary piston 114 in FIG. 1) and a second cylinder base. The first hydraulic chamber 111 and the second hydraulic chamber 116 are therefore separated from one another by way of the displaceably received primary piston 112. The second hydraulic chamber 116 and the third hydraulic chamber 118 are likewise separated from one another by way of the displaceably received secondary piston 114.

The second hydraulic chamber 116 is fluidically coupled to the first brake circuit 10 and the third hydraulic chamber 118 is fluidically coupled to the second brake circuit 20. The second hydraulic chamber 116 and the third hydraulic chamber 118 are likewise in fluidic communication with the unpressurised hydraulic fluid reservoir 170 in known manner. It is thereby ensured that the second hydraulic chamber 116 and the third hydraulic chamber 118 are supplied with sufficient hydraulic fluid at all times so that, upon an actuation of the primary piston 112 and the secondary piston 114, hydraulic fluid can be delivered from the two chambers 116, 118 into the respective brake circuit 10, 20 in order to build up a hydraulic pressure on the wheel brakes 401-404.

The first hydraulic chamber 111 is fluidically coupled to the second cylinder-piston device 260, 262 by way of a fluid path 268. However, it is not fluidically coupled to one of the brake circuits 10, 20. In the brake-by-wire operation, the first hydraulic chamber 111 serves to receive a hydraulic fluid volume delivered from the second cylinder-piston device 260, 262 in a pressure build-up phase or pressure maintenance phase or to deliver received hydraulic fluid back to the second cylinder-piston device 260, 262 in a pressure reduction phase.

The second cylinder-piston device 260, 262 comprises a second piston 262 which is displaceably received in a second cylinder 260. The second piston 262 is coupled to the electromechanical actuator 160 by its end face which faces the electromechanical actuator 160 (right-hand side in FIG. 1). The second piston 262 further defines a hydraulic chamber 264 with its end face which faces away from the electromechanical actuator 160 together with the cylinder 260. The hydraulic chamber 264 is fluidically coupled to the centrally arranged hydraulic reservoir 170 by way of a fluid path 266. It is thereby ensured that the hydraulic chamber 264 is supplied with sufficient hydraulic fluid at all times. The hydraulic chamber 264 is furthermore in direct fluidic contact with the first hydraulic chamber 111 of the first cylinder-piston device by way of the fluid path 268. The second cylinder-piston device 260, 262 does not have a direct fluid connection to one of the two brake circuits 10, 20 of the brake system. It is therefore not possible for hydraulic fluid to be delivered directly to the wheel brakes 401-404 from the second cylinder-piston device. Instead, the second cylinder-piston device is designed to hydraulically actuate the primary piston 112 (and the secondary piston 114 coupled thereto) in the braking operation.

The second piston 262 is actuated by way of the electromechanical actuator 160. In concrete terms, the electromechanical actuator 160 is provided to move the second piston 262 forwards or backwards in the second cylinder 260 depending on control signals received from the ECU 200. Upon a forward stroke of the piston (piston 262 moves to the left in FIG. 1), the actuating force applied by the actuator 160 is transmitted to the hydraulic fluid in the hydraulic chamber 264. A hydraulic pressure is thereby generated in the hydraulic chamber 264, which corresponds precisely to the ratio of the actuating force applied by the actuator 160 and the effective surface of the second piston 262 on which the actuating force acts (effective surface of the second piston 262). Since the hydraulic chamber 264 is fluidically coupled to the first chamber 111 of the first cylinder-piston device 110, 112, 114 by way of the fluid path 268, the hydraulic pressure which has built up in the hydraulic chamber 264 is transmitted to the first chamber 111. The hydraulic pressure generated in the second cylinder-piston device 260, 262 is therefore applied to the rear side of the primary piston 112 as actuating pressure for the primary piston 112. The actuating pressure which has built up results in the displacement of the primary piston 112 and the secondary piston 114 coupled thereto. As a result of the displacement of the primary piston 112 in the direction of the second hydraulic chamber 116, the volume of the first hydraulic chamber 111 increases whilst the volume of the second hydraulic chamber 116 and the third hydraulic chamber 118 of the first cylinder-piston device 110, 112, 114 decreases. The increasing volume of the first hydraulic chamber 111 is supplied continuously with hydraulic fluid displaced from the hydraulic chamber 264 of the second cylinder-piston arrangement 260, 262 so that the actuating pressure on the rear side of the primary piston 112 is always maintained.

The displacement of the primary piston 112 results in a constant increase in the hydraulic pressure in the second and third chamber 112, 114 (and in the wheel circuits 10, 20 and wheel brakes 401-404 coupled thereto). The displacement of the primary piston 112 continues until a hydraulic pressure, which corresponds to the actuating pressure in the first hydraulic chamber 111 or in the hydraulic chamber 264 of the second cylinder-piston device 260, 262, has been established in the hydraulic chambers 116, 118 which are fluidically coupled to the wheel brakes 401-404. The hydraulic pressure on the wheel brakes 401-404 which is generated by hydraulic actuation of the primary piston therefore corresponds to the actuating pressure generated in the second cylinder-piston device 260, 262.

Conversely, upon a return movement (return stroke) of the second piston 262, the actuating pressure in the hydraulic chamber 264 decreases so that hydraulic fluid can flow back out of the first hydraulic chamber 111 of the first cylinder-piston device 110, 112, 114 by way of the fluid path 268 and into the hydraulic chamber 264 of the second cylinder-piston device 260, 264 again. In this case, the primary piston 112 is displaced backwards again (e.g. into its starting position) owing to a hydraulic pressure (residual pressure) which is still present in the brake circuits 10, 20 or owing to the spring force of the spring devices.

Since the hydraulic chambers 111, 264 and the fluid path 268 connecting the two hydraulic chambers 111, 264 are completely filled with hydraulic fluid at all times and hydraulic fluid is not compressible, the actuating pressure which has built up in the chamber 264 is transmitted completely to the primary piston 112 without a time delay (retardation). In other words, any actuating pressure in the hydraulic chamber 264 is transmitted without loss to the primary piston 112 so that this is actuated accordingly. If, for example, an actuating pressure is built up as a result of a forward stroke of the piston 262, a corresponding displacement of the primary piston 112 will take place owing to the effective actuating pressure and a corresponding hydraulic pressure will be built up on the wheel brakes 401-404. If, for example, an actuating pressure which has built up is reduced through a reverse stroke of the piston 262, the primary piston 112 is moved backwards accordingly and the hydraulic pressure on the wheel brakes 401-404 is reduced or decreased accordingly. The force of the actuation of the primary piston 112 depends on the actuating pressure generated by the electromechanical actuator 160 and the second piston 262. As a result of the serial hydraulic coupling between the first cylinder-piston device 110, 112, 114 and the second cylinder-piston device 260, 262 here, a hydraulic pressure can be generated or established on the wheel brakes 401-404 without loss and just as rapidly as if the electromechanical actuator 160 were coupled directly to the first primary piston 112 and an actuation of the primary piston 112 were to take place directly by means of the electromechanical actuator 160.

Instead of a direct coupling of the electromechanical actuator 160 to the first cylinder-piston device 110, 112, 114, the coupling of the electromechanical actuator 160 to a second cylinder-piston device 260, 262, which is fluidically coupled to the first cylinder-piston device 110, 112, 114, further enables a transmission of the actuating force which is to be provided on the primary piston 112. This is because, for each desired hydraulic pressure on the wheel brakes (brake pressure), a particular actuating force has to be applied to the primary piston 112 or to the secondary piston 114, which corresponds to the product of the hydraulic pressure to be generated and an effective piston surface of the primary piston 112 on which the hydraulic pressure acts (effective surface). The greater the effective surface of the primary piston here 112, the greater the actuating force to be applied.

According to a preferred embodiment (not shown in FIG. 1), the effective surface of the second piston 262 is selected to be smaller than the effective surface of the primary piston 112. In this way, the actuating force on the second cylinder-piston device 260, 262, which is to be used to generate a predetermined hydraulic pressure, can be reduced according to the ratio of the two effective surfaces of the first and the second piston. To nevertheless achieve the predetermined hydraulic pressure in the first cylinder-piston device 110, 112, 114, the second piston 262 simply has to cover a longer actuating path. The increase in the actuating path here is inversely proportional to the effective surfaces of the primary piston 112 and the second piston 262.

As a result of the smaller effective surface of the second piston 262, it is possible to achieve a hydraulic power boost wherein the actuating force applied by the electromechanical actuator 160 on the primary piston 112 is boosted by the ratio specified by the two effective surfaces. To achieve a predetermined hydraulic pressure, it is therefore possible for the actuating force which is applied to the second piston 262 to be lower than that applied to the primary piston 112 by the ratio of the two effective surfaces. By comparison with a non-boosted system, the hydraulic boost therefore enables the motor torque and the spindle and bearing forces of the electromechanical actuator to be kept smaller for generating a predetermined hydraulic pressure.

The pedal interface 115 and the third cylinder-piston device 120, as well as the foot-force-dependent actuation of the pistons 112, 114 of the first cylinder-piston device 110, 112, 114 with the aid of the pedal interface 115, are now described in more detail below.

The pedal interface 115 comprises a third hydraulic cylinder 120 having a third piston 122 displaceably received therein. The cylinder 120 and piston 122 in turn define a hydraulic chamber 124, which is fluidically coupled to the simulator circuit 145 of the brake system 1000. The hydraulic chamber 124 is furthermore selectively fluidically coupled to the central hydraulic fluid reservoir 170 by way of a fluid path 140 and an electrically actuable valve 132 received therein. The selective coupling to the hydraulic fluid reservoir 170 guarantees that the hydraulic chamber 124 and/or the simulator circuit 145 are supplied with sufficient hydraulic fluid at all times.

The third piston 122 is furthermore provided with a first plunger 125 and with a second plunger 123. The first plunger 125 is fastened by a first end to an end face of the third piston 122 which faces a brake pedal 126. A second end of the second plunger 125 is mechanically coupled to the brake pedal 126. This enables a pedal actuation (i.e. a depression of the brake pedal 126) to be transmitted to the third piston 122, which is then displaced in the direction of travel (to the left in FIG. 1). The second plunger 123 is fastened to an end face of the third piston 122 which faces the direction of travel. The second plunger 123 is provided to transmit a piston movement to the force transmission device 150. Both plungers can be arranged coaxially to the piston 122.

The force transmission device 150 is designed to transmit an actuating force applied to the brake pedal to the first cylinder-piston device 110, 112, 114. The force transmission device 150 can be constructed as a piston rod 151 which, in the assembled state of the assembly 100, is arranged between the first cylinder-piston arrangement 110, 112, 114 and the third cylinder-piston arrangement 120, 122. In concrete terms, the piston rod 151 can be coupled at one end to the rear side of the primary piston 112 of the first cylinder-piston arrangement 110, 112, 114. The piston rod 151 here can be arranged coaxially to the primary piston 112 and extend in the direction of the third cylinder-piston arrangement 120, 122. The piston rod 151 can be brought into contact with the second plunger 123 by its second end.

As is further shown in FIG. 1, the second end of the piston rod 151 is not coupled directly to the second plunger 123 but can be spatially separated from the second plunger 123 by a clearance (or gap d) 152. This clearance 152 exists so long as the brake pedal 126 has not been actuated. It also exists when the brake pedal 126 is actuated in a normal braking operation since, in this case, the primary piston 112 and the piston rod 151 coupled thereto are hydraulically actuated with the aid of the actuating pressure generated in the second cylinder-piston device 260, 262. In this case, the primary piston 112 and the piston rod 151 coupled thereto are displaced sufficiently (displacement to the left in FIG. 1) so that, even when the brake pedal 126 is depressed and, consequently, when the piston 122 and the second plunger 123 are displaced in the direction of the piston rod 151, the clearance 152 is maintained. Therefore, during a normal operation of the actuator assembly 100, the first plunger 123 does not come into contact with the piston rod 151 and the actuating force acting on the brake pedal 126 cannot be transmitted to the piston rod 151.

In an emergency operation of the actuator assembly 100, the actuator 160 remains unactuated. This also means that the piston rod 151 is not hydraulically displaced. When the brake pedal 126 is depressed, the (small) clearance 152 between the second plunger 123 and the second end of the piston rod 151 can be quickly overcome. The second plunger 123 comes into contact with the piston rod 151. The piston rod 151 then transmits the displacement of the piston 122, which occurs when the brake pedal 126 is depressed, directly to the primary piston 112 of the main brake cylinder 110 in the direction of the piston rod 151 (push-through principle). The primary piston 112 in turn transmits the displacement to the secondary piston 114. The actuation of the primary piston 112 and secondary piston 114 can then cause a hydraulic pressure to build up on the wheel brakes 401-404. The mechanical force transmission device 150 described here therefore enables a direct mechanical coupling of the primary piston 112 to the third piston 122 of the pedal interface 115 or the brake pedal 126 for the build-up of hydraulic pressure during the emergency operation (i.e. if hydraulic pressure is not able to build up by way of the actuator 160).

Since the piston rod 150 and the second plunger 123 are arranged substantially coaxially to the primary piston 112 and the piston rod 122, the mechanical cooperation between the piston rod 151 and the second plunger 123 calls for a substantially mutually coaxial alignment of the first cylinder-piston device 110, 112, 114 and the third cylinder-piston device 120, 122. In other words, the first cylinder-piston device 110, 112, 114 and the third cylinder-piston device 120, 122 are arranged in spatial succession and substantially coaxial to one another.

It is different for the second cylinder-piston device 260, 262. Although this is connected hydraulically in series with the first cylinder-piston device 110, 112, 114, it can be arranged freely depending on the design of the fluid path 268 fluidically connecting the first cylinder-piston device 110, 112 and the second cylinder-piston device 260, 262. In particular, as indicated in FIG. 1, the second cylinder-piston device 260, 262 and the electromechanical actuator 160 coupled thereto can be arranged spatially parallel to the first cylinder-piston device 110, 112, 114 and the third cylinder-piston device 120, 122. It is thus possible to further reduce the axial installation length of the assembly 100 by comparison with the architectures mentioned at the outset.

The simulator circuit 145 is now briefly described blow. The simulator circuit 145 is fluidically coupled to the third cylinder-piston device 120, 122. It can furthermore be selectively fluidically coupled to the hydraulic fluid reservoir 170 by way of the fluid path 140 and the electrically actuable valve 132 arranged therein. The simulator circuit 145 comprises a hydraulic pressure store 144 which is fluidically coupled to the chamber 124 by way of a fluid path 141 (and a throttle valve or throttle non-return valve arranged therein). The hydraulic pressure store 144 is realised as a piston-cylinder arrangement, wherein the piston which is displaceably received in the cylinder is pre-tensioned by a spring. Upon an actuation of the brake pedal 126 in a normal operation (the third piston 122 is not coupled to the primary piston 112, which means that there is no counter force reacting on the brake pedal 126), the hydraulic fluid delivered from the chamber 124 is conducted into the hydraulic pressure store 144 by way of the fluid path 141. The fluid flowing into the hydraulic pressure store 144 thereby displaces the piston which is pre-tensioned by the spring. The force to be applied for the displacement of the piston reacts as a pedal-restoring force on the brake pedal 126. In other words, the hydraulic pressure store 144 generates a counter pressure which reacts on the third piston 122 and on the brake pedal 126. In this way, in a brake-by-wire operation, a counter force acting on the brake pedal 126 is generated, which does not originate from the build-up of pressure in the first cylinder-piston device 110, 112, 114 since the third cylinder-piston device 120, 112 is uncoupled from the first cylinder-piston device 110, 112, 114.

In the push-through operation, the third piston 122 is coupled to the primary piston 112. The pedal reaction behaviour is determined by the hydraulic pressure generated by the primary piston. A reaction behaviour does not need to be simulated in this case. The hydraulic fluid which is displaced out of the chamber 124 can be conveyed without pressure into the hydraulic fluid reservoir 170 by way of the open valve 132.

Figure 2:
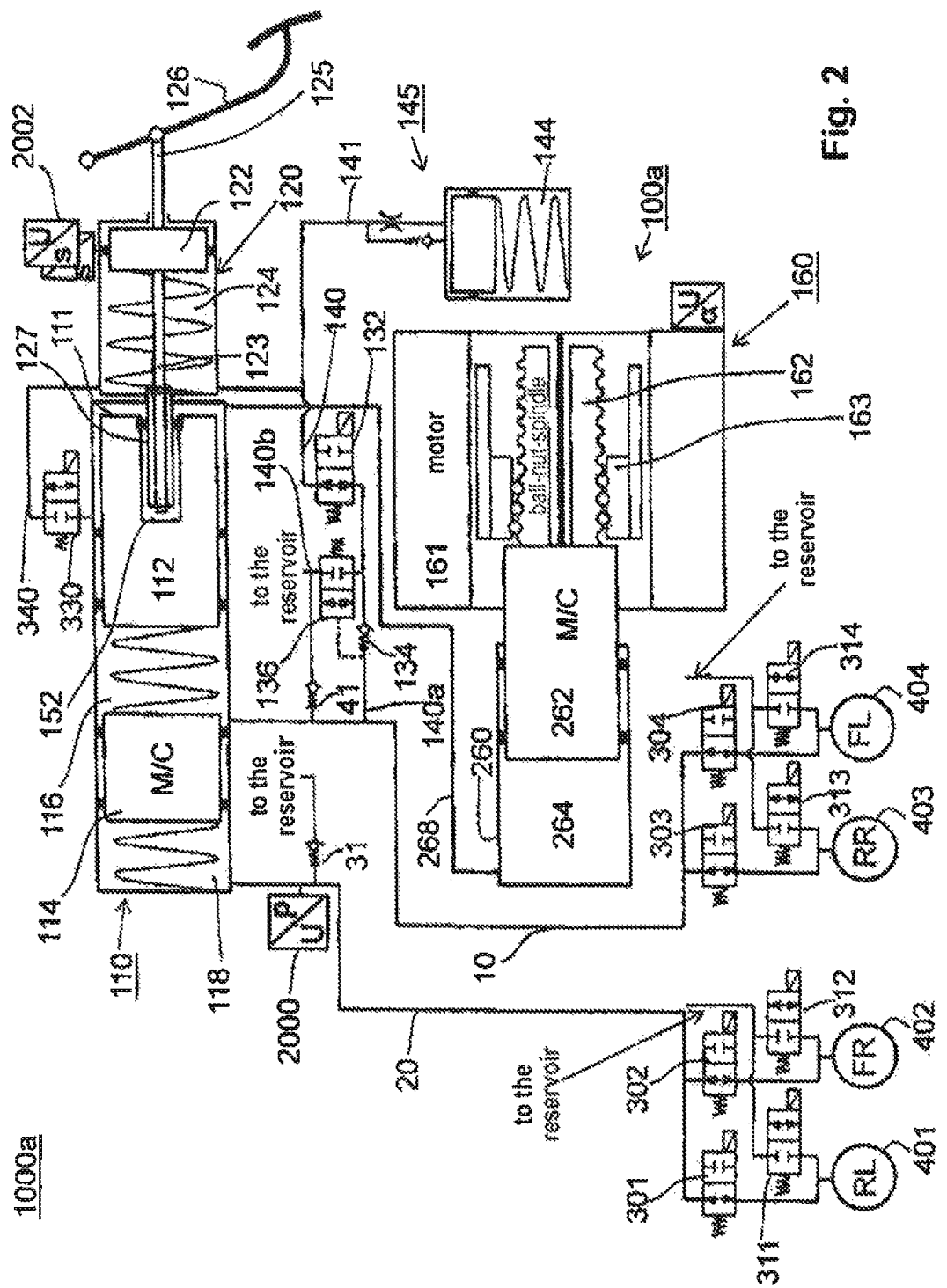
FIG. 2 illustrates a further embodiment of an electro-hydraulic motor vehicle brake system.

A further embodiment of an electro-hydraulic vehicle brake system 1000a is shown in FIG. 2. Components of the brake system 1000a which are similar to those of the brake system 1000 in FIG. 1 in terms of their construction or their function are denoted by the same reference numerals.

The brake system 1000a comprises a hydraulic pressure generator assembly 100, two brake circuits 10, 20, which are fluidically coupled to the hydraulic pressure generator assembly 100 and at the ends of which wheel brakes 401-404 are fluidically coupled in each case, two return lines 30, 40 which can be associated with the two brake circuits 10, 20, a central hydraulic fluid reservoir (not illustrated), a simulator circuit 145, a fluid path 140, which has valves 132, 134, 136 arranged therein and which fluidically couples the simulator circuit 145 and the hydraulic fluid reservoir, and a further fluid path 340, which has a valve 330 arranged therein and which fluidically couples the simulator circuit 145 and the assembly 100. The brake system 1000a further comprises an electronic control unit, or ECU for short (not illustrated in FIG. 2), for controlling the assembly 100 and valves of the brake system 1000a as well as a plurality of electrically actuable valves 301-304 which are arranged in the brake circuits 10, 20 and in the return lines 30, 40 and are described in more detail below.

The functions described in conjunction with the brake system 1000 in FIG. 1 are associated with the hydraulic fluid reservoir 170 and the simulator circuit 145. In this regard, please refer to the corresponding description of FIG. 1.

The assembly 100 is firstly described in more detail. The assembly 100 comprises a first cylinder-piston device 110, 112, 114 for generating hydraulic pressure on the wheel brakes 401-404, a second cylinder piston device 260, 262 with an electromechanical actuator 160 acting on the second cylinder-piston device 260, 262 for the purpose of generating an actuating pressure for the first cylinder-piston device 110, 112, 114, a fluid path 268 fluidically coupling the second cylinder-piston device 260, 262 to the first cylinder-piston device 110, 112, 114 for the purpose of transmitting the actuating pressure to the first cylinder-piston device 110, 112, 114, and a pedal interface 115 with a third cylinder-piston device 120, 122 and a transmission device 123 for directly transmitting a foot force applied to the brake pedal 126 to the first cylinder-piston device 110, 112, 114.

The assembly 100a differs from the assembly 100 illustrated in FIG. 1 merely in the concrete design of the primary piston 112 of the first cylinder-piston device 110, the transmission device 123 for transmitting a foot force in the push-through braking operation and in the concrete design of the electromechanical actuator 160.

The first cylinder-piston device 110, 112, 114 and the third cylinder-piston device 120, 122, which can be mechanically coupled to the first cylinder-piston device 110, 112, 114, are firstly described.

The construction and function of the first cylinder-piston device 110, 112, 114 and the third cylinder-piston device 120, 122 correspond substantially to the construction and the function of the first cylinder-piston device 110, 112, 114 shown in FIG. 1 and the third cylinder-piston device 120, 122. The first cylinder-piston device 110, 112, 114 in turn comprises a primary piston 112 and a secondary piston 114, which define three successively arranged hydraulic chambers 111, 116, 118 in the cylinder 110. A first hydraulic chamber 111 is fluidically coupled to the second cylinder-piston device by way of a fluid path 268. A second hydraulic chamber 116 is fluidically coupled to the first brake circuit 10 and a second hydraulic chamber 118 is fluidically coupled to the second brake circuit 20 of the brake system 1000a. With regard to the mode of operation of the first cylinder-piston device 110, 112, 114 please refer to the appropriate text relating to FIG. 1.

The first cylinder-piston device 110, 112, 114 and the third cylinder-piston device 120, 122 are arranged in spatial succession in the assembled state. The third cylinder-piston device 120, 122 is arranged coaxially to the first cylinder-piston device 110, 112, 114 here. The third piston 122 of the third cylinder-piston device 120, 122 is in turn mechanically coupled to a first plunger 125 and to a second plunger 123. The first plunger 125 is coupled in known manner to the brake pedal 126 for transmitting a pedal actuation to the third piston 122. The second plunger 123 is coupled at one end to the third piston 122. It extends along the chamber 124 of the third cylinder-piston device 120, 122 and into the first cylinder-piston device 110, 112, 114 arranged downstream. To this end, the third cylinder 120 has a bore in the cylinder base for guiding-through the plunger 123. The bore is sealed by sealing elements so that hydraulic fluid cannot escape out of the chamber 123.

On its end face which faces the third cylinder-piston device 120, 122, the first cylinder 110 of the first cylinder-piston device 110, 112, 114 similarly has a tubular shaft 127, which is arranged coaxially with respect to the first cylinder 110 and is formed inwardly for receiving the plunger portion 123 which projects out of the third cylinder-piston device 120, 126. In the assembled state, the first plunger portion 123 projects into the shaft 127 of the first cylinder-piston device 110, 112, 114 and is spatially separated from the primary piston 112 merely by a narrow clearance 152. In the embodiment shown in FIG. 2, the primary piston 112 has a U-shaped profile on its rear side, with the shaft 127 projecting into the U-shaped cutout of the primary piston 112.

The hydraulic chamber 111 is defined by the rear side of the piston and the inside wall of the first cylinder 110 and the shaft 127.

The plunger 123 serves as a force transmission device for transmitting a foot force to the primary piston 112 in a push-through operation. In the push-through operation, an electro-hydraulic actuation of the primary piston 112 does not take place. The clearance 152 between the plunger 123 and the rear side of the primary piston 112 can be quickly overcome when the pedal 126 is depressed. The second plunger 123 comes into contact with the primary piston 112 and transmits each further movement directly to the primary piston 112, whereby a hydraulic pressure can be built up in the first cylinder piston device 110, 112, 114. In the brake-by-wire operation, the actuation of the primary piston 112 is effected by the actuating pressure which has built up in the second cylinder-piston device 260, 262. The hydraulic actuation of the primary piston 112 has the effect that the primary piston 112 runs sufficiently ahead of the plunger 123 so that, in the brake-by-wire operation, the clearance 152 cannot be overcome by depressing the brake pedal 126. It is thereby possible to guarantee that, in the brake-by-wire operation, the hydraulic pressure is built up or established exclusively with the aid of the second cylinder-piston device 260, 262.

The second cylinder-piston device 260, 262 and the electromechanical actuator 160 coupled to the second to the second cylinder-piston device 260, 262 are now described.

The electromechanical actuator 160 comprises an electric motor 161 and a gear 162, 163 coupled to the electric motor 161 for transmitting the motor movement to the second piston 262 of the second cylinder-piston device 260, 262. In the embodiment, the gear is an arrangement of a rotatably mounted nut 163 and a spindle 162 which is in engagement with the nut 163 (e.g. by way of rolling elements such as balls) and is movable in the axial direction. In other embodiments, it is possible to use rack and pinion gears or other gear types.

In the present embodiment, the electric motor 161 is of a cylindrical construction and extends concentrically to the gear 162, 163. More precisely, the electric motor 161 is arranged radially externally in relation to the gear 162, 163. A rotor (not illustrated) of the electric motor 161 is coupled in rotatably fixed manner to the gear nut 163 in order to set this latter in rotation. A rotational movement of the nut 163 is transmitted to the spindle 162 to result in an axial displacement of the spindle 162. The left-hand end face of the spindle 162 in FIG. 1 is or can be mechanically coupled to the second piston 262. An axial displacement of the spindle 162 is therefore transmitted directly to the second piston 162, whereby this latter is displaced in the second cylinder 260, along the cylinder 260.

The electromechanical actuator 160 is therefore suitable for building up an actuating pressure for the primary piston 112 of the first cylinder-piston device 110, 112, 114 autonomously by way of the piston 262 (i.e. independently of a foot force). The level of the pressure build-up can be specified by way of a least one control value of the ECU 200, which contains information relating to how strongly the actuator 160 should be actuated (e.g. the extent to which the spindle 162 should be displaced in the actuating direction to generate hydraulic pressure). The control value can be determined according to sensor technology (e.g. by means of travel and/or force sensor technology 2002) coupled to the brake pedal 126 or the pedal interface 115. The actuating pressure built up in the second chamber 264 is transmitted to the primary piston 112 of the first cylinder-piston device 110, 112, 114 by way of the fluid path 268. The primary piston 112 and the secondary piston 114 coupled thereto are actuated as a result of the hydraulic pressure applied (i.e. displaced to the left in FIG. 2) until the hydraulic pressure generated in the hydraulic chambers 116 and 118 (and therefore the braking pressure applied to the brakes 401-404) corresponds to the actuating pressure applied in the first hydraulic chamber 111. As a result of the hydraulic coupling between the first cylinder-piston device 110, 112, 114 and second cylinder-piston device 260, 262, which is already described in conjunction with FIG. 1, a hydraulic pressure on the wheel brakes 401-404 can be generated in the same manner as if the electromechanical actuator were coupled directly to the first cylinder-piston device 110, 112, 114. In particular, the serial arrangement of the two cylinder-piston devices enables the realisation of a hydraulic power boost as described in FIG. 1 in conjunction with the first embodiment.

Following the description of the assembly 100*a*, the valves of the wheel brake 1000*a*, which are shown in FIG. 2, will now be described.

As shown in FIG. 2, the brake system 1000*a* (or a hydraulic control unit or HCU which is associated with the brake system 1000*a*) comprises a first group of four electrically actuable valves 301-304, with precisely one valve 301-304 being associated with each wheel brake 401-404. The valve 301-304 associated with each wheel brake 401-404 is designed to hydraulically couple or hydraulically uncouple the wheel brake 401-404 from the first cylinder-piston device 110, 112, 114 depending on the state of operation of the valve 301-304. The time-based control of the individual valves 301-304 is implemented here by way of the ECU.

For example, the valves 301-304 can be actuated by the ECU in a time multiplex operation. In this case, at least one time slot for a valve actuation can be associated with each valve 301-304 (and therefore each wheel brake 401-404). This association does not exclude individual valves 301-304 from being kept open or closed over a plurality of time slots here or more than two valves being open at the same time. It is thus possible during service braking (when the assembly 100 is in normal operation) for the hydraulic pressure which has built up on the wheel brakes 401-404 by means of the actuator assembly 100 to be adjusted for each individual wheel or individual wheel group for the purpose of vehicle dynamics management (i.e. during ABS and/or ASR and/or ESP regulation for example).

The brake system 1000a further comprises a second group of four electrically actuable valves 311-314, with precisely one valve 311-314 being associated with each wheel brake 401-404. The valves 311-314 are arranged in the return lines of the wheel brakes 401-404 here, with the return lines of the wheel brakes 401-404 of a brake circuit 10, 20 leading into the return line 30, 40 associated with the brake circuit 10, 20 at the valve outlet of the valves 311-314. The return lines 30, 40 lead into the hydraulic fluid reservoir 170. The two valves 311-314 each assume a closed valve position in the non-actuated state so that hydraulic fluid is unable to flow from the respective wheel brakes 401-404 into the unpressurised hydraulic fluid reservoir 170. Within the context of vehicle dynamics management (e.g. ABS and/or ASR and/or ESP regulation) they can be switched to an open valve position by means of an electrical control of the ECU 200 to enable hydraulic fluid to flow into the unpressurised hydraulic fluid reservoir 170 in controlled manner by way of the respective brake circuit 10, 20.

The two brake circuits 10, 20 and the return lines 30, 40 associated with the two brake circuits 10, 20 can each be fluidically coupled to one another by way of a non-return valve 31, 41. As seen from the first cylinder-piston device 110, 112, 114, the non-return valves 31, 41 here are arranged upstream of the valves 301-304, 311-314 in a fluid path coupling the first brake circuit 10 to the first return line 40 and in a fluid path coupling the second brake circuit 20 to the second return line 30. The two non-return valves 31, 41 are arranged here in such a way that they do not allow hydraulic fluid to flow from the respective brake circuit 10, 20 into the respective return line 30, 40. On the other hand, however, hydraulic fluid can flow directly from the hydraulic fluid reservoir 170 into the two chambers 116, 118 of the first cylinder-piston device 110, 112, 114 by way of the non-return valves. This can be the case for example when the primary piston 112 and the secondary piston 114 are on their reverse stroke and a negative pressure is generated in the chambers 116, 118. It is thereby possible to ensure that the chambers 116, 118 of the first cylinder-piston device 110 are also supplied with sufficient hydraulic fluid after actuation.

Following the description of the valves 31, 41, 301-304, the valves 132, 134, 136 arranged in the fluid path 140 will now be described.

In contrast to the brake system 1000 illustrated in FIG. 1, two further valves 134, 136 are arranged in addition to the electrically actuable valve 132 in the fluid path 140 of the brake system 1000a illustrated in FIG. 2. These two valves 134, 136 are constructed as pressure-controlled overpressure valves. They are provided to additionally feed hydraulic fluid which has been displaced from the third cylinder-piston device 120, 122 in the push-through operation of the brake system 1000a into at least one brake circuit 10, 20 of the brake system 1000a. The hydraulic fluid which is additionally introduced into the brake circuit 10, 20 can help to rapidly overcome an air gap which is present at the wheel brakes 401-404 in the push-through operation.

Downstream of the electrically actuable valve 132, the fluid path 140 is divided into a first branch 140a and a second branch 140b, with the first branch 140a opening into the first brake circuit 10 and the second branch 140b opening into the unpressurised hydraulic reservoir 170 or into the return line 40 leading to the unpressurised hydraulic reservoir 170. The first overpressure valve 134 is arranged in the first branch 140a of the second fluid path 140. The second overpressure valve 136 is arranged in the second branch 140b of the second fluid path 140. In normal operation of the brake system 1000a, the electrically actuable valve 132 is switched to a closed state so that the valves 134, 136 arranged downstream are of no significance.

In a push-through braking operation, the valve 132 remains unactuated and therefore in an open valve position. Hydraulic fluid which has been displaced from the hydraulic cylinder 120 in the push-through operation can then flow over the open valve 132 to the first and second overpressure valves 134, 136 arranged downstream and flow either into the first brake circuit 10 or into the hydraulic fluid reservoir 170 by way of these valves (depending on the hydraulic pressure in the first brake circuit 10).

The first overpressure valve 134 is constructed in the form of a non-return valve. The non-return valve 134 is arranged in such a way that, in an open valve position, it only allows hydraulic fluid to flow from the hydraulic cylinder 120 into the first brake circuit 10, but blocks it completely in the reverse direction. The first non-return valve 134 is constructed as a spring-loaded non-return valve which is restricted to a low overflow pressure (e.g. of 0.3 bar). Therefore, in the push-through operation, hydraulic fluid from the third hydraulic cylinder 120 can always be fed via the valve 132 (this is open in the push-through operation) and the non-return valve 134 connected downstream into the first brake circuit 10 (and, via the first cylinder-piston device 110, 112, 114 fluidically coupled thereto, also into the second brake circuit 20) if the hydraulic pressure generated through the displacement of the third piston 122 in the third cylinder 120 is greater than the valve overflow pressure and the hydraulic pressure applied at the valve outlet of the non-return valve 134.

The second overpressure valve 136 is constructed as a pressure-controlled overpressure valve 136 which, when a predetermined pressure is reached in the first cylinder-piston device 110, 112, 114 or in the first brake circuit 10 (for example 10 bar), switches from a closed state to an open state. The second overpressure valve 136 is fluidically coupled to the first brake circuit 10 for control purposes (see dashed line on the valve 136 in FIG. 2). When the predetermined pressure is reached in the first brake circuit 10, the overpressure valve 136 switches to an open valve position. The hydraulic fluid which has accumulated in the fluid path 140 and at the valve inlets of the valves 134, 136 during the push-through operation can then flow without pressure into the unpressurised hydraulic fluid reservoir 170 by way of the second sub-path 140b. The second overpressure valve 136 therefore specifies for how long hydraulic fluid is fed from the third cylinder-piston device 120, 122 into the brake circuit 10, 20. In particular, the valve 136 prevents hydraulic fluid from accumulating unnecessarily at the first non-return valve 134 if, for example during the push-through phase, the pressure generated in the first cylinder-piston device 110, 112, 114 approaches or even exceeds the pressure generated in the third cylinder 120.

The fluid path 340 and the electrically actuable valve 330 arranged therein are now described below.

The fluid path 340 leads at one end into the first hydraulic chamber 111 of the first cylinder-piston device 110, 112, 114 and, at a second end, into the hydraulic chamber 124 of the third cylinder piston device 120, 122. The fluid path 340 therefore enables a selective fluid coupling of the third cylinder-piston device 120, 122 and the simulator circuit 145 coupled thereto to the first hydraulic chamber 111 and the second cylinder-piston device 260, 262 coupled thereto. This fluidic coupling can be used for the implementation of automatic testing procedures or an automatic bleeding procedure for the simulator circuit 145, as explained briefly below.

The electrically actuable valve 330 arranged in the fluid path 340 assumes a closed valve position in the unactuated (flow-less) state. The valve 330 remains closed during the normal operation and during the push-through operation of the assembly 100. Hydraulic fluid from the second cylinder-piston device 260, 262 is therefore unable to arrive via the fluid path 340 in the third cylinder-piston device 120, 122 or in the simulator circuit 145 which is fluidically coupled thereto.

Beyond the braking operation, a fluidic coupling of the second cylinder-piston device 260, 262 to the third cylinder-piston device 120, 122 and the simulator circuit 145 may be desired within the framework of an automatic testing procedure or an automatic bleeding procedure for the simulator circuit 145.

For example, within the framework of a testing procedure or bleeding procedure for the simulator circuit 145 which takes place outside the braking operation, the valve 330 can be opened, the valve 132 in the parallel fluid path 132 can be closed and the actuator 160 can be actuated. Hydraulic fluid can therefore be conveyed from the chamber 264 of the second cylinder-piston device 260, 262 directly into the third cylinder-piston device 120, 122 and the simulator circuit 145 coupled thereto. In concrete terms, the conveyed hydraulic fluid flows over the fluid path 268, over the chamber 111, the activated fluid path 340, the chamber 124 and the fluid path 141 into the hydraulic pressure store 144 of the simulator circuit 145. The hydraulic pressure store 144 generates a counter pressure here. The displaced hydraulic fluid can be measured as a function of a pressure increase in the chamber 264. The hydraulic fluid volume displaced during the actuation of the actuator can be determined here by recording an actuating movement of the electromechanical actuator 160 (e.g. from the motor position and the known transmission ratio of the gear). The increase in pressure can be determined in the hydraulic chamber 264 or in the simulator circuit (not illustrated in FIG. 1) by way of a pressure sensor. The pressure-volume characteristic obtained can then be compared with a stored pressure-volume characteristic and a conclusion can be drawn from this as to the bleed rate of the simulator circuit 145. This is because fluid which is contaminated with air is compressible and exhibits a pressure-volume characteristic which is different from that of a pure fluid. To particularly prevent the pressure which has built up by means of the second cylinder-piston device and is present in the simulator circuit 145 from partially dropping away as a result of the displacement of the primary piston 112 in the first hydraulic chamber 112, the valves 301-304 leading to the wheel brakes 401-404 can be switched to a closed valve position during the testing procedure. The hydraulic fluid which is displaced into the simulator circuit 145 can be conducted via the fluid path 140 into the hydraulic fluid reservoir 170 following the testing procedure. This simply requires the electrically actuable valve 132 arranged in the fluid path 140 to be switched back into an open valve position.

In summary, it should be noted that the brake systems 1000, 1000a and hydraulic pressure generator assemblies 100, 100a described here are constructed to realise a brake-by-wire braking operation and a push-through braking operation. In particular, the hydraulic pressure generator 100, 100a described here is also designed to realise an automatic testing procedure and a bleeding procedure of the simulator circuit of the brake system 1000, 1000a.

As in the brake system architectures mentioned at the outset, according to the brake system architecture presented here, a hydraulic pressure is built up on the wheel brakes 401-404 by way of the first cylinder-piston device 110, 112, 114 alone. The first cylinder-piston device 110, 112, 114 therefore corresponds functionally to a main brake cylinder of the vehicle brake system. In contrast to the brake system architectures mentioned at the outset, the actuation of the at least one first piston of the first cylinder-piston device 110, 112, 114 is effected hydraulically by way of the second cylinder-piston device 260, 262 in the brake-by-wire operation. The hydraulic actuation described here is advantageous in that the electromechanical actuator does not have to be directly mechanically coupled to the first cylinder-piston device 110, 112, 114. It is thus possible to further simplify the construction of the assembly 100. In particular, the installation length of the assembly 100, 110a can be reduced as a result of the parallel arrangement of the first cylinder-piston device 110, 112, 114 and the second cylinder-piston device 260, 262. Furthermore, suitable dimensioning of the first cylinder-piston device 110, 112, 114 and the second cylinder-piston device 260, 262 can result in the realisation of a hydraulic power boost which can further reduce the actuating force to be applied by the electromechanical actuator 160. When compared to the brake systems mentioned at the outset, it is therefore possible to use less powerful electromechanical actuators in order to generate a necessary hydraulic pressure during a brake-by-wire braking operation.

The principle and mode of operation of this invention have been explained and illustrated in its preferred embodiment. However, it must be understood that this invention may be practiced otherwise than as specifically explained and illustrated without departing from its spirit or scope.

The invention claimed is:
1. An electro-hydraulic motor vehicle brake system, comprising:
   a first cylinder-piston device, which can be fluidically coupled to at least one wheel brake of the brake system, for generating hydraulic pressure on the at least one wheel brake, wherein the first cylinder-piston device comprises at least one first piston;
   a second cylinder-piston device, which comprises at least one second piston; and
   an electromechanical actuator acting on the second piston of the second cylinder-piston device;
   wherein the second cylinder-piston device is or can be fluidically coupled at an output side to the at least one first piston of the first cylinder-piston device in order to provide hydraulic pressure, which is generated in the second cylinder-piston device upon actuation of the electromechanical actuator, for actuating the at least one first piston of the first cylinder-piston device;
   a pedal interface, which can be coupled to a brake pedal, with a third cylinder-piston device, comprising a chamber and being coupled to a simulator circuit, which can be selectively fluidically coupled to the first cylinder-piston device for generating hydraulic pressure;
   wherein the first cylinder-piston device has at least two hydraulic chambers defined by a cylinder and the at least one first piston, wherein a first chamber is fluidically coupled at the inlet side to the second cylinder-piston device, and wherein at least one second chamber can be fluidically coupled to at least one brake circuit of the brake system; and wherein the third cylinder-piston device can be fluidically coupled to the second cylinder-piston device by way of the first chamber of the first cylinder-piston device.

2. The electro-hydraulic brake system according to claim 1, wherein the generation of hydraulic pressure on the at least one wheel brake is effected solely by way of the first cylinder-piston device.

3. The electro-hydraulic brake system according to claim 1, wherein the third cylinder-piston device is coupled to the first cylinder-piston device in a push-through operation of the brake system in order to enable a foot-force-dependent actuation of the first piston for generating hydraulic pressure.

4. The electro-hydraulic brake system according to claim 1, wherein the second cylinder-piston device is provided to supply the hydraulic pressure for the hydraulic actuation of the first piston of the first cylinder-piston device in a brake-by-wire operation of the brake system.

5. The electro-hydraulic brake system according to claim 4, wherein the provision of the hydraulic pressure takes place as a function of a detected braking intention or a command from a vehicle dynamics management program.

6. The electro-hydraulic brake system according to claim 1, wherein the first cylinder-piston device and the second cylinder-piston device are fluidically connected in series by way of a fluid path.

7. The electro-hydraulic brake system according to claim 1, wherein the at least one second chamber comprises two hydraulic chambers, which are arranged in succession in the cylinder and are or can be fluidically coupled in each case to a brake circuit of the brake system.

8. The electro-hydraulic brake system according to claim 1, wherein the first cylinder-piston device and the third cylinder-piston device are arranged in spatial succession.

9. The electro-hydraulic brake system according to claim 1, wherein the first cylinder-piston device and the second cylinder-piston device are arranged substantially spatially parallel to one another.

10. The electro-hydraulic brake system according to claim 1, further comprising a control device or control device system for electrically controlling the electro-mechanical actuator in the brake-by-wire operation.

11. An electro-hydraulic brake system according to claim 1, wherein an effective surface of the at least one first piston and an effective surface of the second piston are at a predetermined ratio to one another.

12. An electro-hydraulic brake system according to claim 11, wherein the effective surface of the at least one first piston is greater than the effective surface of the second piston.

* * * * *